(12) United States Patent
Lin et al.

(10) Patent No.: US 11,770,160 B2
(45) Date of Patent: Sep. 26, 2023

(54) HIDDEN CHAMBER DETECTOR

(71) Applicant: INTELLIGENT FUSION TECHNOLOGY, INC., Germantown, MD (US)

(72) Inventors: Xingping Lin, Germantown, MD (US); Genshe Chen, Germantown, MD (US); Khanh Pham, Kirtland AFB, NM (US); Erik Blasch, Arlington, VA (US); Zhonghai Wang, Germantown, MD (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 745 days.

(21) Appl. No.: 16/813,250

(22) Filed: Mar. 9, 2020

(65) Prior Publication Data
US 2023/0179265 A1    Jun. 8, 2023

(51) Int. Cl.
*H04B 7/0413* (2017.01)
*G01S 7/35* (2006.01)
*G01S 7/03* (2006.01)
*G01S 13/34* (2006.01)

(52) U.S. Cl.
CPC .............. *H04B 7/0413* (2013.01); *G01S 7/032* (2013.01); *G01S 7/354* (2013.01); *G01S 13/34* (2013.01)

(58) Field of Classification Search
CPC ........ H04B 7/0413; G01S 7/032; G01S 7/354; G01S 13/34
USPC .......................................................... 342/22
See application file for complete search history.

(56) References Cited

U.S. PATENT DOCUMENTS

| | | | | |
|---|---|---|---|---|
| 4,134,113 A | * | 1/1979 | Powell ............... | G01S 13/9089 342/149 |
| 4,315,333 A | * | 2/1982 | Yamashita et al. .... | H03D 7/161 455/189.1 |
| 4,387,373 A | * | 6/1983 | Longuemare, Jr. . | G01S 13/9092 342/149 |
| 4,978,963 A | * | 12/1990 | Thorpe .................... | G01S 3/48 342/442 |
| 5,619,061 A | * | 4/1997 | Goldsmith et al. ...... | H01G 5/40 257/415 |

(Continued)

FOREIGN PATENT DOCUMENTS

| | | | | |
|---|---|---|---|---|
| CN | 104267401 A | * | 1/2015 | .............. G01S 13/9011 |
| CN | 105548972 A | * | 5/2016 | .................G01S 13/90 |

(Continued)

*Primary Examiner* — Nuzhat Pervin
(74) *Attorney, Agent, or Firm* — ANOVA LAW GROUP, PLLC

(57) ABSTRACT

A hidden chamber detector includes a linear frequency modulated continuous wave (LFMCW) radar, a synthetic aperture radar (SAR) imaging processor, and a time division multiple access (TDMA) multiple input multiple output (MIMO) antenna array, including a plurality of transmitting and receiving (Tx-Rx) antenna pairs. A Tx-Rx antenna pair is selected, in a time division manner, as a Tx antenna and an Rx antenna for the LFMCW radar. The LFMCW radar is configured to transmit an illumination signal, receive an echo signal, convert the echo signal to a baseband signal, collect baseband samples, and send the collected samples to the SAR imaging processor. The SAR imaging processor is configured to receive the collected samples, collect structure/configuration of the antenna array and scanning information, and form an SAR image based on the collected samples, the structure/configuration of the antenna array, and the scanning information.

12 Claims, 6 Drawing Sheets

(56) References Cited

U.S. PATENT DOCUMENTS

| | | | |
|---|---|---|---|
| 9,857,463 B2* | 1/2018 | Nogueira-Nine | G01S 13/343 |
| 10,218,550 B1* | 2/2019 | Kim et al. | H04B 1/0028 |
| 10,714,836 B1* | 7/2020 | Karabacak et al. | H04B 7/0868 |
| 11,360,185 B2* | 6/2022 | Jungmaier et al. | G01S 7/032 |
| 11,454,702 B2* | 9/2022 | Krieger et al. | G01S 13/9056 |
| 2004/0212358 A1* | 10/2004 | Stephen et al. | H03J 7/32 |
| | | | 324/76.19 |
| 2009/0014520 A1* | 1/2009 | Kofman et al. | G06K 19/06037 |
| | | | 235/492 |
| 2014/0111374 A1* | 4/2014 | Case et al. | G01S 13/9011 |
| | | | 342/25 F |
| 2014/0247181 A1* | 9/2014 | Nogueira-Nine | G01S 13/343 |
| | | | 342/128 |
| 2014/0266868 A1* | 9/2014 | Schuman | G01S 13/9029 |
| | | | 342/25 R |
| 2017/0099608 A1* | 4/2017 | Lam et al. | H04B 1/16 |
| 2018/0329047 A1* | 11/2018 | Wang et al. | G01S 13/34 |
| 2019/0386712 A1* | 12/2019 | Fang | H04B 7/043 |
| 2020/0014429 A1* | 1/2020 | Leung | H04B 1/0067 |
| 2021/0208272 A1* | 7/2021 | Lavian et al. | H03L 7/091 |
| 2021/0405182 A1* | 12/2021 | Reynolds et al. | G01S 13/888 |

FOREIGN PATENT DOCUMENTS

| | | | | |
|---|---|---|---|---|
| EP | 2762916 A2* | 8/2014 | | G01S 13/003 |
| EP | 1966630 B1* | 4/2017 | | G01S 13/9035 |
| EP | 3425422 A1* | 1/2019 | | G01S 13/9058 |
| EP | 3021132 B1* | 3/2020 | | G01S 13/343 |
| JP | 2020504811 A * | 2/2020 | | G01S 13/90 |
| WO | 2007076824 A2* | 7/2007 | | G01S 13/9035 |
| WO | 2009030339 A1* | 3/2009 | | G01S 13/9035 |
| WO | 2019226194 A3* | 1/2020 | | G01S 13/9052 |

* cited by examiner

HIDDEN CHAMBER DETECTOR

GOVERNMENT RIGHTS

This invention was made with Government support under Contract No. H92222-18-P-0032, awarded by the U.S. Operations Command (USSOCOM). The U.S. Government has certain rights in this invention.

FIELD OF THE DISCLOSURE

The disclosure generally relates to the field of radar technology, more particularly, relates to a hidden chamber detector based on a linear frequency modulated continuous wave (LFMCW) time division multiple access (TDMA) multiple input multiple output (MIMO) synthetic aperture radar (SAR).

BACKGROUND

Conventionally, to detect hidden chambers in or attached to a room, an inspector uses his/her eyes and hands to inspect the environment. However, because the environment of the room may be complex and the entrances or openings of the hidden chambers are often well camouflaged, the detection efficiency and the inspection speed may highly depend on the inspector's experience. Therefore, a human inspector requires rather complex training in order to quickly and accurately find out hidden chambers.

To improve the detection efficiency, technological devices such as radar have been adopted for detecting hidden chambers. In the case where a radar is adopted to assist the inspection of hidden chambers, the radar often uses a narrow band receiver and only covers a small distance, such that the detection efficiency is still low. Recently, a linear frequency modulated continuous wave (LFMCW) time division multiple access has been developed, and the LFMCW radar demonstrates high sensitivity and has a large coverage range. By adopting the LFMCW radar together with a TDMA MIMO antenna array and a SAR imaging processor, the disclosed hidden chamber detector is directed to solve one or more problems set forth above and other problems in the art.

BRIEF SUMMARY OF THE DISCLOSURE

The present disclosure provides a hidden chamber detector. The hidden chamber detector includes a linear frequency modulated continuous wave (LFMCW) radar, a synthetic aperture radar (SAR) imaging processor, and a time division multiple access (TDMA) multiple input multiple output (MIMO) antenna array. The TDMA MIMO antenna array includes a plurality of transmitting and receiving (Tx-Rx) antenna pairs formed by a plurality of transmitting (Tx) antenna elements and a plurality of receiving (Rx) antenna elements. A Tx-Rx antenna pair is selected, in a time division manner, from the plurality of Tx-Rx antenna pairs to serve as a Tx antenna and an Rx antenna for the LFMCW radar. The LFMCW radar is configured to transmit an illumination signal through the Tx antenna, receive an echo signal through the Rx antenna, convert the received echo signal to a baseband signal, collect baseband samples, and send the collected samples to the SAR imaging processor. The SAR imaging processor is configured to receive the collected samples of the echo signal, collect structure/configuration of the TDMA MIMO antenna array and radar range scanning information, and form an SAR image based on the collected samples, the structure/configuration of the TDMA MIMO antenna array, and the radar range scanning information.

Another aspect of the present disclosure provides a method for detecting a hidden chamber using a hidden chamber detector. The hidden chamber detector includes a linear frequency modulated continuous wave (LFMCW) radar, a synthetic aperture radar (SAR) imaging processor, and a time division multiple access (TDMA) multiple input multiple output (MIMO) antenna array, including a plurality of receiving (Rx) antenna elements and a plurality of transmitting (Tx) antenna elements. The method includes selecting, in a time division manner, a Tx-Rx antenna pair from the plurality of Tx-Rx antenna pairs to serve as a Tx antenna and an Rx antenna for the LFMCW radar; transmitting an illumination signal through the Tx antenna; converting the received echo signal to a baseband signal; collecting baseband samples; collecting structure/configuration of the TDMA MIMO antenna array, and radar range scanning information; and forming an SAR image based on the collected baseband samples, the structure/configuration of the TDMA MIMO antenna array, and the radar range scanning information.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or similar parts.

Figure 1:
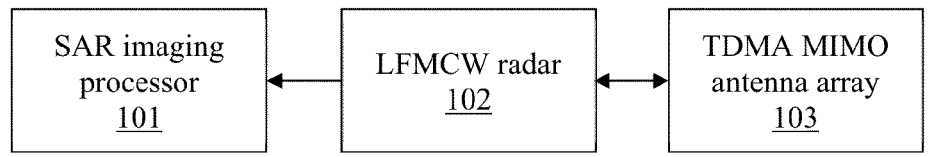
FIG. 1 illustrates a schematic structural diagram of an exemplary hidden chamber detector according to various embodiments of the present disclosure.

The present disclosure provides a hidden chamber detector. FIG. 1 illustrates a schematic structural diagram of an exemplary hidden chamber detector according to various embodiments of the present disclosure. Referring to FIG.

1, the hidden chamber detector may include a synthetic aperture radar (SAR) imaging processor 101, a linear frequency modulated continuous wave (LFMCW) radar 102, and a time division multiple access (TDMA) multiple input multiple output (MIMO) antenna array 103.

Figure 2:
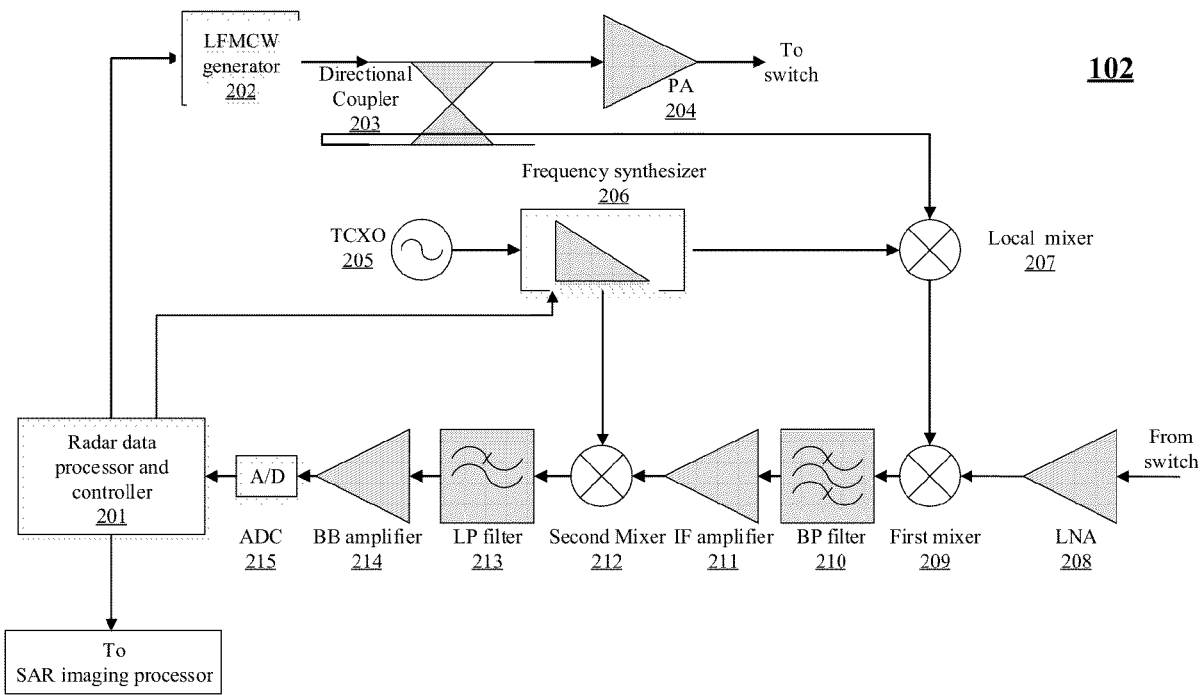
FIG. 2 illustrates a schematic structural diagram of an LFMCW radar used in an exemplary hidden chamber detector according to various embodiments of the present disclosure.

The LFMCW radar may have a direct down conversion structure, a double down conversion structure, or any other appropriate structure. In the following, an LFMCW radar with a double down conversion structure is provided as an example for further illustration. FIG. 2 illustrates a schematic structural diagram of an LFMCW radar used in an exemplary hidden chamber detector according to various embodiments of the present disclosure. Referring to FIG. 2, the LFMCW radar of the hidden chamber detector may include a radar data processor and controller 201, an LFMCW generator 202, a directional coupler 203, a power amplifier 204, a temperature compensated crystal oscillator (TCXO) 205, a frequency synthesizer 206, a local mixer 207, a low noise amplifier (LNA) 208, a first mixer 209, a bandpass (BP) filter 210, an intermediate-frequency (IF) amplifier 211, a second mixer 212, a low pass (LP) filter 213, a baseband (BB) amplifier 214, and an analog-to-digital converter (ADC) 215. The arrows in FIG. 2 indicate the transmission directions of the signals.

The LFMCW generator 202, the directional coupler 203, and the power amplifier 204 may together serve as a transmitter for the LFMCW radar 102. The output of the power amplifier 204 may be connected to a transmitting antenna through a switch.

In one embodiment, the LFMCW signal generator 202 may generate a radar signal. The directional coupler 203 may transmit a large portion of the radar signal to the power amplifier 204, and may couple a small portion of the radar signal to the local mixer 207 to generate a first local oscillating signal. The power amplifier 204 may send the amplified signal to the transmitting antenna (not shown) through the switch.

The TCXO 205, the frequency synthesizer 206, the local mixer 207, the LNA 208, the first mixer 209, the BP filter 210, the IF amplifier 211, the second mixer 212, the LP filter 213, the BB amplifier 214, and the ADC 215 may together serve as a receiver for the LFMCW radar 102. The input of the LNA 208 may be connected to a receiving antenna through a switch.

In one embodiment, the receiver may have a double super-heterodyne structure. The first stage of the double super-heterodyne structure may convert the frequency of the signal received by the receiver to an intermediate frequency. The TCXO 205 may serve as frequency reference for the frequency synthesizer 206, and the frequency synthesizer 206 may be configured to provide a first local oscillating signal with a desired frequency such that the receiver may accordingly cover a desired sub-range of the radar coverage distance. The second stage of the double superheterodyne structure may convert the IF signal to a baseband signal. The BP filter 210 is applied to select signals within the desired intermediate frequency band and filter out undesirable signals such as noise and leakage signals from the transmitter. The LFMCW radar structure with the disclosed architecture thus has improved sensitivity and the transmitter may only need to transmit a lower power radar signal.

The TCXO 205 may generate a reference signal and the reference signal may be inputted into the frequency synthesizer 206 that is connected to and controlled by the radar data processor and controller 201. The frequency synthesizer 206 may generate a high-quality first local oscillating signal. The first local oscillating signal may be subsequently mixed with the transmitted radar signal and further mixed with the received signal to determine a desired IF component. The determined IF component may be further used to determine the range of coverage scanned by the LFMCW radar at each time. For example, the frequency synthesizer 206 may be configured to scan a desired frequency range so as to ensure a desired corresponding sub-range coverage that can be scanned by the LFMCW radar structure.

The first local oscillating signal and the portion of the radar signal coupled by the directional coupler 203 may be inputted into the local mixer 207 to generate a first output signal, which includes two frequency components.

The portion of the radar signal transmitted by the transmitting antenna may be reflected back by a target and may be received by the receiving antenna as an echo signal, which may include a Doppler frequency shift component due to the relative movement between the target and the LFMCW radar structure. The received signal may be amplified by the LNA 208 and then may be mixed with the first output signal by the first mixer 209. The signal coming out from the first mixer 209, which may also be referred to as the first downconverter, may include the desired IF signal.

The output signal of the first mixer 209 may be sent to the BP filter 210. In one embodiment, the pass band of the BP filter 210 may be sufficiently narrow such that the BP filter 210 may be able to minimize the impact of signals that are outside of the allowable frequency range defined by the BP filter 210. In addition, the frequency range defined by the BP filter 210 may be designed to allow signals with proper frequencies to pass through such that a desired coverage range is obtained based on the passed signal. As such, the arrangement of the LFMCW radar structure may ensure that noise and leakage of the transmitter are filtered out by the BP filter 210 such that the receiver may have high sensitivity. Accordingly, a transmitter with lower transmitting power may be used for obtaining a radar coverage range that is comparable with high power radars.

Further, the output signal of the BP filter 210 may be amplified by the IF amplifier 211 and then be sent to the second mixer 212. The second mixer 212 may mix the amplified signal, also referred to as second receiver mixer/downconverter, with a second local oscillating signal outputted by the frequency synthesizer 206 to generate a fourth output signal. The frequency of the fourth output signal may include two main components, and the component with a higher frequency may be filtered out by the LP filter 213. That is, only the component of the fourth output signal with a lower frequency may pass through the LP filter 213. The output signal of the LP filter 213 may further be amplified by the BB amplifier 214 to form a fifth output signal.

The fifth output signal may be inputted into the ADC 215 to be sampled and transformed to a digital signal, which may be further transmitted to the radar data processor and controller 201 for subsequent data processing. As such, results of a target range in the scanning range may be determined.

The LFMCW radar structure and the operation principle described above may be used to realize scans for certain desired sub-ranges, and the distance between the target and the LFMCW radar may be calculated based on the time interval between the two moments when the radar signal is transmitted to the target from the transmitter and reflected back to the receiver from the target, respectively.

As such, the LFMCW radar may have range scanning capability by tuning the first local oscillator frequency, and may also have the background noise reduction capability. The radar signal bandwidth may depend on the required range resolution (or depth resolution in the SAR image). Moreover, the radar carrier frequency may depend on the tradeoff between the penetration loss and the detector size.

Figure 3:
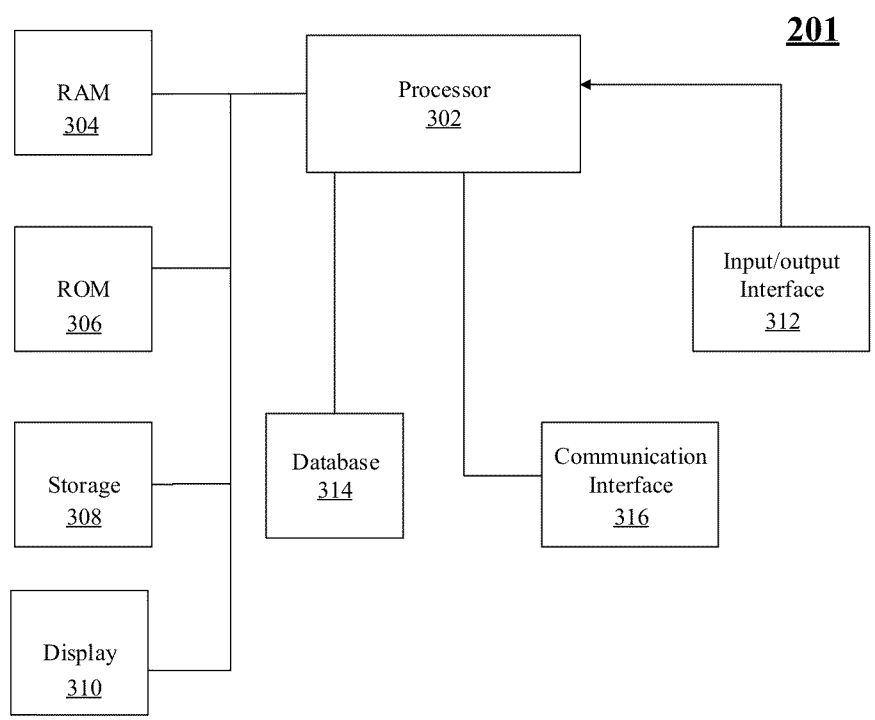
FIG. 3 illustrates a schematic block diagram of a radar data processor and controller in the LFMCW radar shown in FIG. 2.

FIG. 3 illustrates a schematic block diagram of a radar data processor and controller in the LFMCW radar shown in FIG. 2. Referring to FIG. 3, in one embodiment, the radar data processor and controller 201 may include a processor 302, a random access memory (RAM) 304, a read-only memory (ROM) 306, a storage 308, a display 310, an input/output interface 312, a database 314, and a communication interface 316. In other embodiments, the radar data processor and controller may include other components or certain devices may be removed without departing from the principles of the present disclosure.

In one embodiment, the radar data processor and controller 201 may be configured to receive, process, and execute commands from operator and the LFMCW radar structure. The radar data processor and controller 201 may be any appropriately configured computer system.

In one embodiment, the processor 302 may include any appropriate type of general purpose microprocessor, digital process or microcontroller, and application specific integrated circuit (ASIC). The processor 302 may execute sequences of computer program instructions to perform various processes associated with radar data processor and controller 201. The computer program instructions may be loaded into RAM 304 and may be executed by the processor 302 from the ROM 306, or from the storage 308. The storage 308 may include any appropriate type of mass storage provided to store any type of information that the processor 302 may need to perform the processes. For example, the storage 308 may include one or more hard disk devices, optical disk devices, flash disks, or other storage devices to provide storage space.

The display 310 may provide information to an operator of the radar data processor and controller 201. The display 310 may include any appropriate type of display device, such as cathode ray tube (CRT) or liquid crystal display (LCD) based devices. The input/output interface 312 may provide the operator the capability to input information into the radar data processor and controller 201, or for the operator to receive information from the radar data processor and controller 201. For example, the input/output interface 312 may include any appropriate input device, such as a keyboard, a mouse, an electronic tablet, a voice communication device, a touch screen, or any other optical or wireless input devices. Further, the input/output interface 312 may receive from and/or send to other external devices.

In one embodiment, the database 314 may include any type of commercial or customized database, and may also include analysis tools for analyzing the information in the data bases. The data base 314 may be used for sorting information for semiconductor manufacturing and other related information. The communication interface 316 may provide communication connections such that the radar data processor and controller 201 may be accessed remotely and/or may communicate with other devices through computer networks or other communication networks via various communication protocols, such as transmission control protocol/internet protocol (TCP/IP), hypertext transfer protocol (HTTP), etc.

In one embodiment, an operator may input commands through the input/output interface 312 to start range scanning. The processor 202 may receive, process, and execute the commands to start the detection process. The communication interface may receive the digital signals transmitted by the ADC 215 (referring to FIG. 2) and send the received data to the ROM 306 and the storage 308 to be stored and further processed. After the data is processed, the result of the range scanning can be obtained. The result may be returned to the operator via the display 310 of the input/output interface 312.

Figure 4:
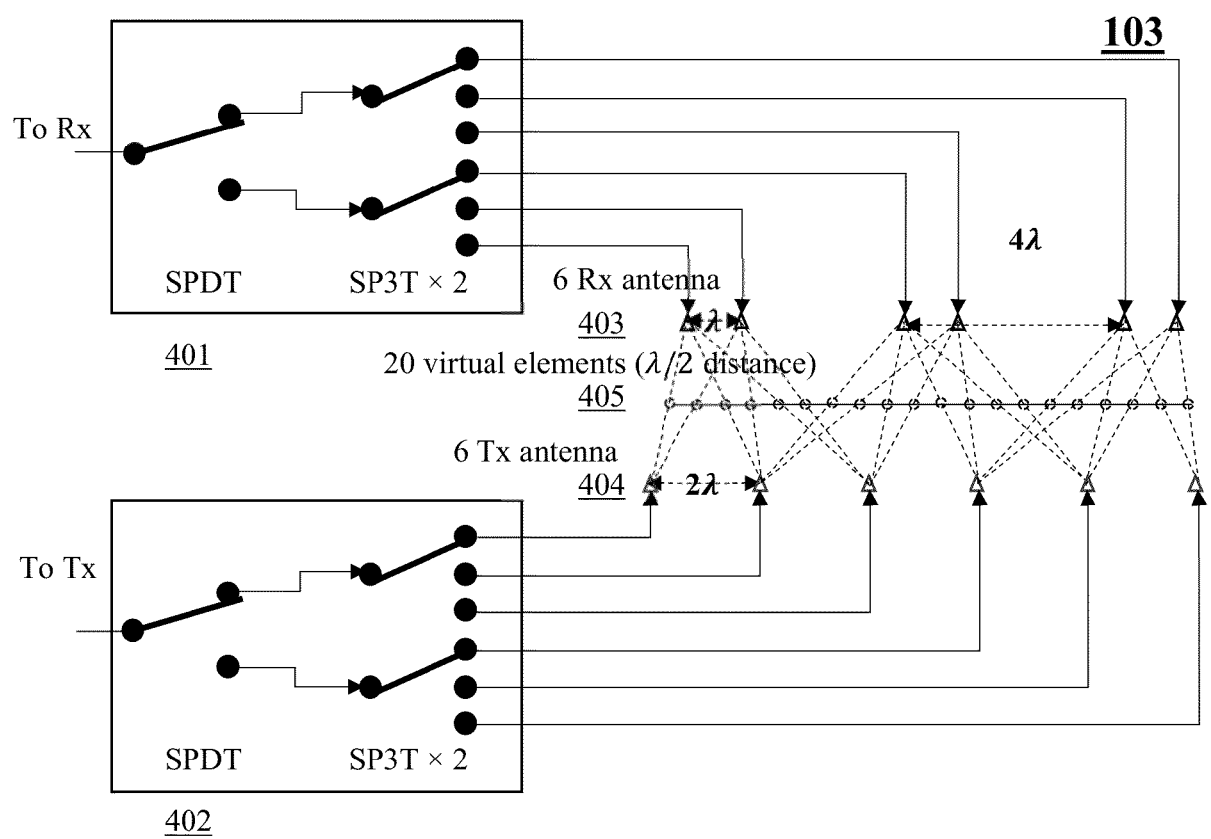
FIG. 4 illustrates a schematic diagram of a TDMA MIMO antenna array adopted by an exemplary hidden chamber detector according to various embodiments of the present disclosure.

FIG. 4 illustrates a schematic diagram of a TDMA MIMO antenna array adopted by an exemplary hidden chamber detector according to various embodiments of the present disclosure. Referring to FIG. 4, the TDMA MIMO antenna array 103 (referring to FIG. 1) may include a plurality of receiving (Rx) antenna elements 403, a plurality of transmitting (Tx) antenna elements 404, a single-pole multiple-throw (SPMT) Rx switch 401, and a SPMT Tx switch 402. Therefore, one transmitter (or receiver) may be able to work with a plurality of antenna elements, including the plurality of Tx antenna elements 404 and the plurality of Rx antenna elements 403. The plurality of Tx antenna elements 404 and the plurality of Rx antenna elements 403 may form a plurality of Tx-Rx antenna pairs, serving as the elements of a virtual MIMO antenna array 405. Each element of the virtual MIMO antenna array 405 may include a Tx antenna element 404 and an Rx antenna element 403. The SPMT Rx switch 401 and the SPMT Tx switch 402 may be used to select a Tx antenna element 404 and an Rx antenna element, respectively to form an element of the MIMO antenna array 405 for the operation of the LFMCW radar.

Referring to FIG. 4, in one embodiment, with a plurality of triangles representing the locations of the Tx and Rx antenna elements, the distance between adjacent Tx antenna elements is $2\lambda$ ($\lambda$ is the wavelength of the operating frequency), and the distance between adjacent Rx antenna elements is $\lambda$. In this manner, a virtual MIMO antenna array 405 may be formed. As shown in FIG. 4, the elements of the virtual MIMO antenna array 405 are represented by circles, and the distance between adjacent elements of the virtual MIMO antenna array 405 is $\frac{1}{2}\lambda$.

In one embodiment, when the virtual MIMO antenna array 405 is used as the antenna for an LFMCW radar 102 (referring to FIG. 1) to inspect a target, the target information corresponding to each element of the virtual MIMO antenna array may be collected, and after collecting all the target information corresponding to the plurality of elements of the virtual MIMO antenna array, the obtained target information may be further processed by the SAR imaging processor 101 (referring to FIG. 1) to obtain an SAR image.

For example, at any time instance, the LFMCW radar 102 may select a Tx-Rx antenna pair (i.e., an element of the virtual MIMO antenna array) as the transmitting antenna and the receiving antenna, respectively. The LFMCW may transmit an illumination signal, receive an echo signal from the target, convert the received echo signal to a baseband signal, collect baseband samples, and then send the collected samples to the SAR imaging processor 101. The SAR imaging processor 101 may receive the collected samples of the echo signal, collect the structure/configuration of the virtual MIMO antenna array and the radar range scanning information, and form an SAR image for the target scene based on the collected samples, the structure/configuration of the virtual MIMO antenna array, and the radar range scanning information.

In one embodiment, the SAR imaging processor 101 may receive the raw data of the target echoes, and may then form an SAR image of the target scene. When there is no hidden chamber, the SAR image may only contain features corresponding to the room wall. In a case where a chamber is hidden behind a wall, features associated with the hidden chamber may appear in the SAR image and thus the chamber can be detected.

In one embodiment, the hidden chamber can be detected, localized, and displayed on a display device of the hidden chamber detector, and the LFMCW TDMA MIMO SAR may be configured with multiple transmitting antennas and multiple receiving antennas. The SAR image angular resolution along the array direction may depend on the size of the virtual MIMO antenna array. In one embodiment, the elements of the virtual MIMO antenna array may determine to the angular resolution along the array direction (the vertical direction), and the narrow antenna beam may determine the angular resolution in the array movement direction.

In one embodiment, the hidden chamber detector may further include an inertial measurement unit (IMU). The IMU may be configured to measure the movement of the detector and provide the measured movement to the SAR imaging processor for forming the SAR image of the target.

In one embodiment, the hidden chamber detector may further include a laser indicator or a pilot laser for indicating the area that the hidden chamber detector is scanning and/or covering. As such, the laser indicator or the pilot laser may assist in determining the region or area to be scanned in a next step.

Figure 5:
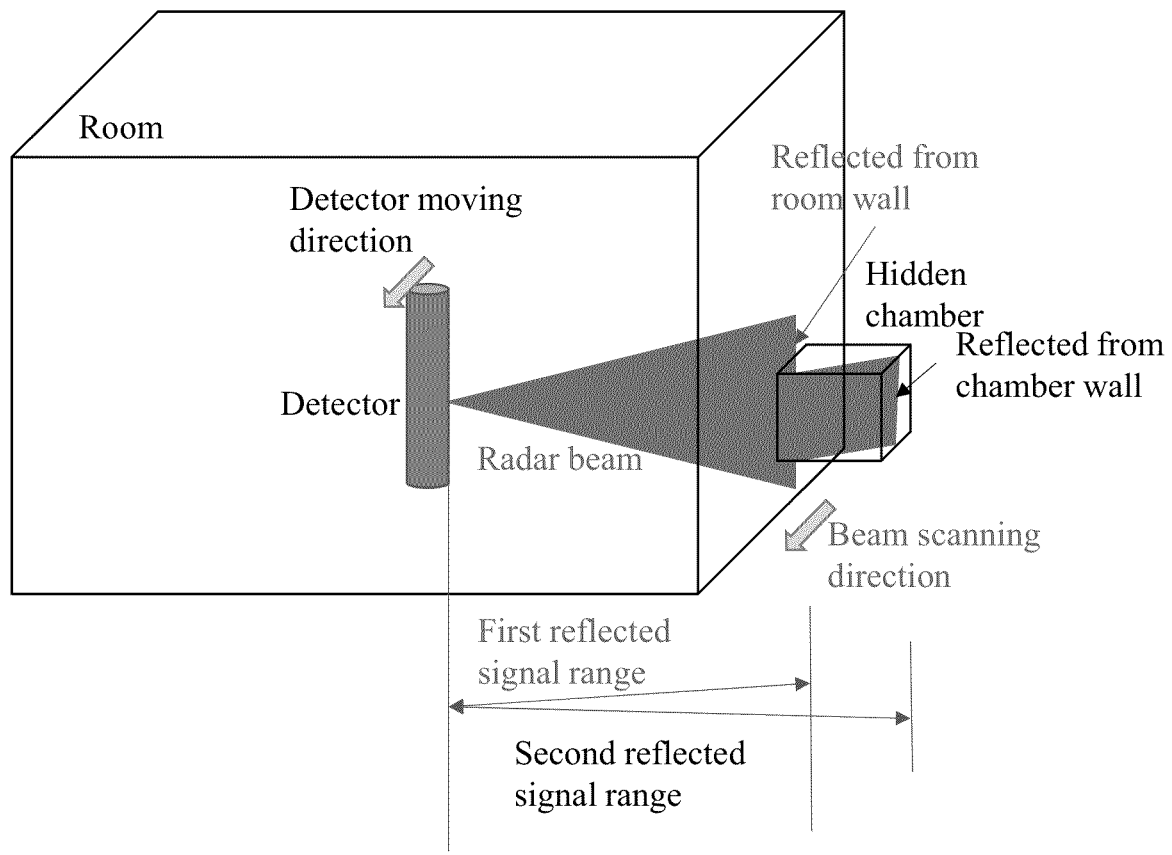
FIG. 5 illustrates a schematic application scenario of an exemplary hidden chamber detector according to various embodiments of the present disclosure.

The present disclosure also provides a method of detecting hidden chamber using a hidden chamber detector consistent with various embodiments of the present disclosure. FIG. 5 illustrates a schematic application scenario of an exemplary hidden chamber detector according to various embodiments of the present disclosure. Referring to FIG. 5, a hidden chamber detector according to various embodiments of the present disclosure may be applied to detect whether these is a hidden chamber behind a wall of a target room. The operation principle of the hidden chamber detector is to scan the wall of the target room and form an image of the wall with high depth resolution and proper angular resolution (cross range resolution). In order to perform the scan, the hidden chamber detector may be moved along a horizontal direction parallel with the wall to be investigated. The LFMCW radar of the hidden chamber detector may transmit radar beam toward the wall, and the hidden chamber detector may receive the echo signal bounced back from the wall and form a depth profile of the reflection surfaces based on the echo signal.

Figure 6:
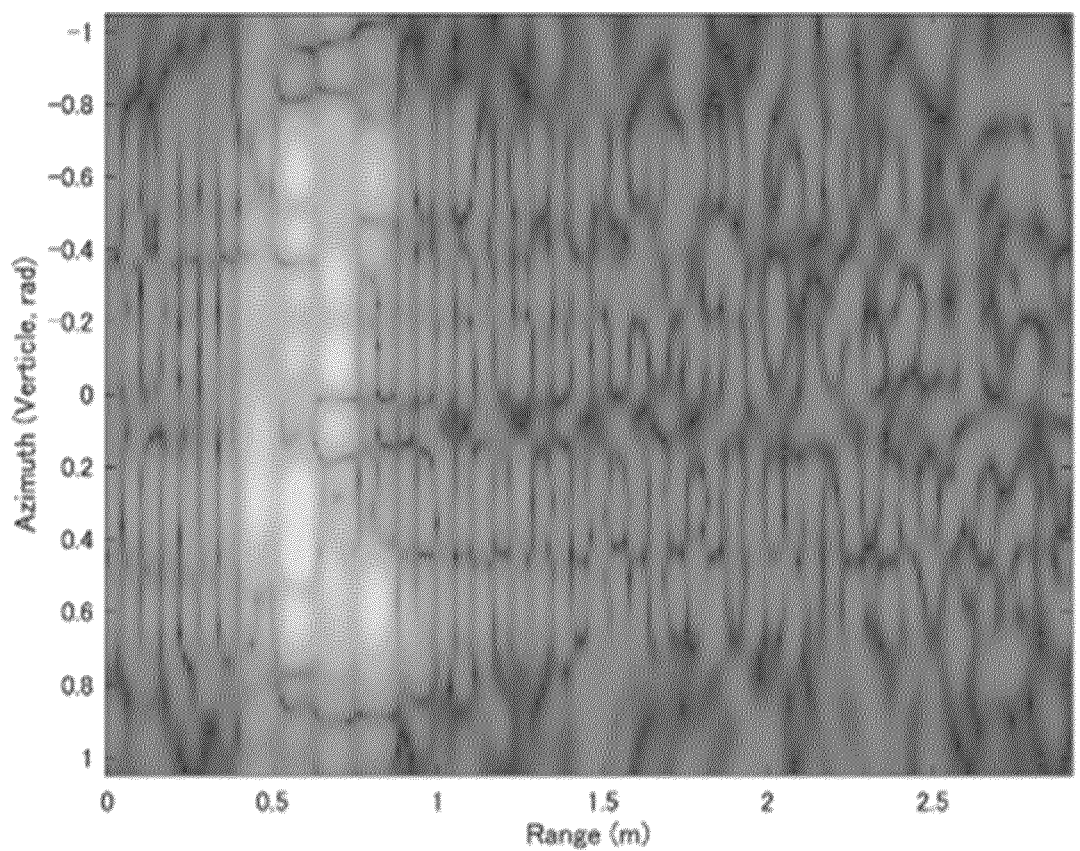
FIG. 6 illustrates an exemplary SAR image of a wall-only room obtained by a hidden chamber detector according to various embodiments of the present disclosure.

In one embodiment, when there is no hidden chamber behind the wall, the radar may only receive echo signals from the room wall. FIG. 6 illustrates an exemplary SAR image of a wall-only room obtained by a hidden chamber detector according to various embodiments of the present disclosure. Referring to FIG. 6, a light color in the SAR image is used to indicate a reflection surface determined from the echo signal. When there is no hidden chamber behind the wall, the light-grayscale region shown in the SAR image may have a single depth profile, which corresponds to approximately 0.6 m and is consistent with the distance from the hidden chamber detector to the wall. As such, a user operating the hidden chamber detector may be able to determine that no other reflecting surface behind the wall, and thus may conclude that there is no hidden chamber behind the wall.

Figure 7:
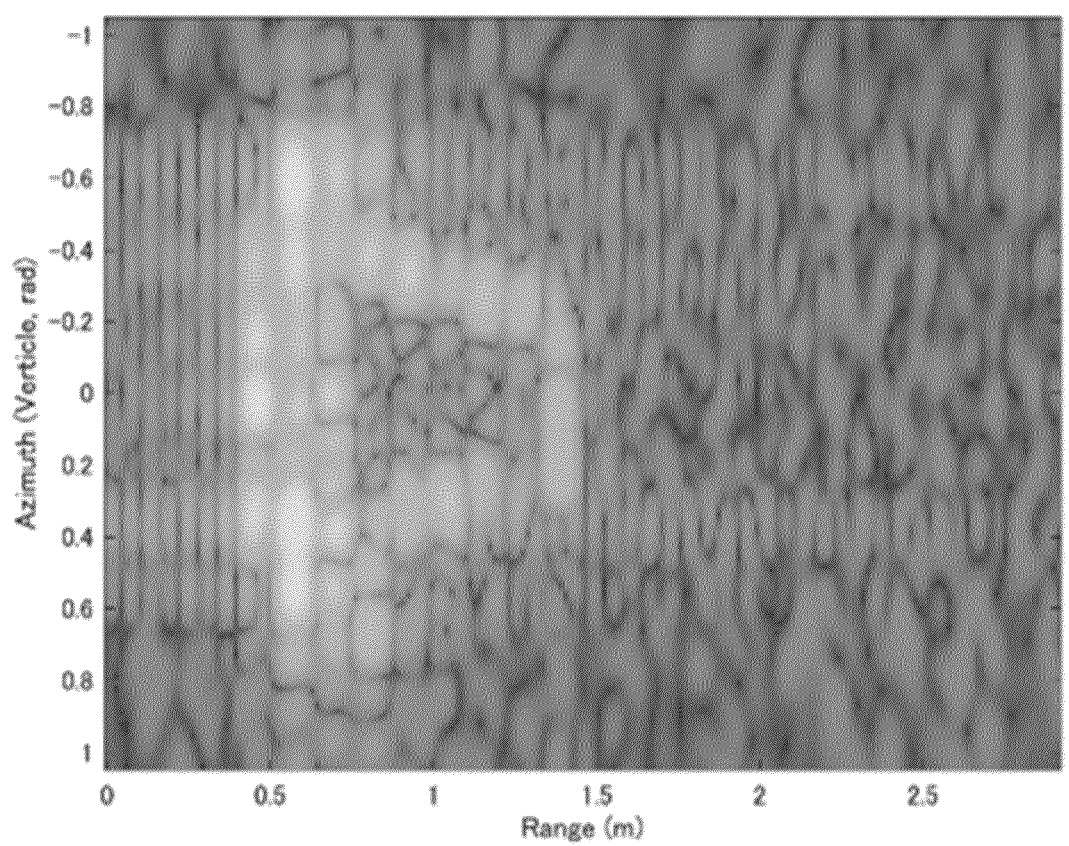
FIG. 7 illustrates an exemplary SAR image of a room with a hidden chamber behind a wall obtained by a hidden chamber detector according to various embodiments of the present disclosure.

In other embodiments, when there is a hidden chamber behind wall as schematically illustrated in FIG. 5, the radar may receive echo signals not only from the wall but also from the surface of the hidden chamber behind the wall. FIG. 7 illustrates an exemplary SAR image of a room with a hidden chamber behind a wall obtained by a hidden chamber detector according to various embodiments of the present disclosure. Referring to FIG. 7, again, a light color in the SAR image is used to indicate a reflection surface determined from the echo signal. When there is a hidden chamber behind the wall, the light-grayscale region shown in the SAR image may have two depth profiles, corresponding to approximately 0.6 m and 1.3 m, respectively. The first depth profile, e.g., 0.6 m, may be consistent with the distance from the hidden chamber detector to the wall; while the second depth, e.g., 1.3 m, may be consistent with the distance from the hidden chamber detector to the back surface of the hidden chamber. As such, a user operating the hidden chamber detector may be able to determine that there is another reflecting surface behind the wall, and thus may take further action according to a predetermined investigation procedure.

Compared to the traditional human implemented hidden chamber detection, the use of the disclosed hidden chamber detector may demonstrate the following exemplary advantages.

According to the disclosed hidden chamber detector, an LFMCW radar is used to construct the hidden chamber detector, such that the LFMCW radar signal is able to obtain a high data processing gain, and thus a lower transmitter power may be able to satisfy application requirements. In addition, a gated receiver is adopted, and thus the receiver noise bandwidth is reduced, and thus the hidden chamber detector may have improved receiver sensitivity, which may further reduce the requirement on the transmitter power.

Further, the hidden chamber detector adopts an MIMO SAR structure, such that the hidden chamber detector is able to scan a target region without moving the detector in the array direction.

The disclosed hidden chamber detector may have desired characteristics, including low size, weight, and power (SWaP). Therefore, the hidden chamber detector may be suitable for handheld applications.

The disclosed hidden chamber detector may have multiple transmitting antennas sharing one transmitter and multiple receiving antennas sharing one receiver, and may include a lot of parts commercially available off the shelf. Therefore, the cost of the hidden chamber detector may be low.

Moreover, the disclosed hidden chamber detector only requires a user to scan the target wall with a distance from the wall, and the irregular movement generated by the user is calibrated using IMU measurements. The hidden chamber detector may also provide automatic and warning signals (audible and visible) during operation. In addition, the hidden chamber detector may be further equipped with a laser indicator or a pilot laser to help the user know the location that have been scanned and determine where to scan in the next step. Therefore, with various user-friendly interfaces, the disclosed hidden detector is easy to operate, and complex training may be avoided.

As such, compared with the traditional human implemented hidden chamber detection, the LFMCW TDMA MIMO SAR based chamber detector has much higher detection rate and scanning speed.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A hidden chamber detector, comprising:
a linear frequency modulated continuous wave (LFMCW) radar including a transmitter and a receiver;
a synthetic aperture radar (SAR) imaging processor; and
a time division multiple access (TDMA) multiple input multiple output (MIMO) antenna array, including a plurality of transmitting and receiving (Tx-Rx) antenna pairs formed by a plurality of transmitting (Tx) antenna elements arranged in a row and separated by a distance of two wavelengths of an operating frequency and a plurality of receiving (Rx) antenna elements arranged in a row in parallel with the row of the plurality of Tx antenna elements and separated by a distance of one wavelength of the operating frequency, a single-pole multiple-throw (SPMT) Rx switch configured between the receiver and the plurality of Rx antenna elements, and a SPMT Tx switch configured between the transmitter and the plurality of Tx antenna elements, wherein:
 a Tx-Rx antenna pair is selected, by controlling the SPMT Tx switch and the SPMT Rx switch in a time division manner, from the plurality of Tx-Rx antenna pairs to serve as a Tx antenna and an Rx antenna for the LFMCW radar;
 the LFMCW radar is configured to transmit a radar signal amplified by a power amplifier through the Tx antenna, receive an echo signal through the Rx antenna, convert the received echo signal to a baseband signal, collect baseband samples, and send the collected samples to the SAR imaging processor; and
 the SAR imaging processor is configured to receive the collected baseband samples of the echo signal, collect structure/configuration of the TDMA MIMO antenna array and radar range scanning information, and form an SAR image based on the collected baseband samples, the structure/configuration of the TDMA MIMO antenna array, and the radar range scanning information.

2. The hidden chamber detector according to claim 1, wherein:
the LFMCW radar includes a frequency synthesizer, a local mixer, a first mixer, a second mixer, and a bandpass (BP) filter, wherein:
 the frequency synthesizer is configured to generate a first local oscillating signal and a second local oscillating signal, a frequency of the first local oscillating signal varying in a frequency range with each frequency corresponding to a sub-range of a coverage range scanned by the LFMCW radar;
 the local mixer is configured to mix a copy of a transmitted radar signal and the first local oscillating signal to generate a first output signal corresponding to the received echo signal;
 the first mixer is configured to mix the first output signal and the received echo signal to generate a second output signal that includes an intermediate frequency (IF) signal;
 the BP filter is configured to generate a third output signal by filtering the second output signal and select the IF signal with a first frequency corresponding to a sub-range of the coverage range scanned by the LFMCW radar; and
 the second mixer is configured to mix the second local oscillating signal and the third output signal to generate a fourth output signal that includes the baseband signal.

3. The hidden chamber detector according to claim 2, wherein:
the LFMCW radar further includes a low pass (LP) filter configured to filter out high frequency components from the fourth output signal to obtain the baseband signal.

4. The hidden chamber detector according to claim 3, wherein:
the frequency synthesizer, the local mixer, the first mixer, the second mixer, the BP filter, and the LP filter of the LFMCW radar form a double superheterodyne receiver structure.

5. The hidden chamber detector according to claim 1, further including:
an inertial measurement unit (IMU), wherein:
 the IMU is configured to measure movement of the hidden chamber detector and provide the measured movement to the SAR imaging processor for forming the SAR image.

6. The hidden chamber detector according to claim 1, further including:
a display device for displaying the SAR image.

7. A method for detecting a hidden chamber using a hidden chamber detector, wherein:
the hidden chamber detector includes a linear frequency modulated continuous wave (LFMCW) radar including a transmitter and a receiver, a synthetic aperture radar (SAR) imaging processor, and a time division multiple access (TDMA) multiple input multiple output (MIMO) antenna array, including a plurality of transmitting and receiving (Tx-Rx) antenna pairs formed by a plurality of transmitting (Tx) antenna elements arranged in a row and separated by a distance of two wavelengths of an operating frequency and a plurality of receiving (Rx) antenna elements arranged in a row in parallel with the row of the plurality of Tx antenna elements and separated by a distance of one wavelength of the operating frequency, a single-pole multiple-throw (SPMT) Rx switch configured between the receiver and the plurality of Rx antenna elements, and a SPMT Tx switch configured between the transmitter and the plurality of Tx antenna elements; and
the method includes:
 selecting, by controlling the SPMT Tx switch and the SPMT Rx switch in a time division manner, a Tx-Rx antenna pair from the plurality of Tx-Rx antenna pairs to serve as a Tx antenna and an Rx antenna for the LFMCW radar;
 transmitting a radar signal amplified by a power amplifier through the Tx antenna;
 receiving an echo signal through the Rx antenna;
 converting the received echo signal to a baseband signal;
 collecting baseband samples;
 collecting structure/configuration of the TDMA MIMO antenna array, and radar range scanning information; and
 forming an SAR image based on the collected baseband samples, the structure/configuration of the TDMA MIMO antenna array, and the radar range scanning information.

8. The method according to claim 7, wherein:
the LFMCW radar of the hidden chamber detector includes a frequency synthesizer, a local mixer, a first mixer, a second mixer, and a bandpass (BP) filter, and
the method includes:
 generating, by the frequency synthesizer, a first local oscillating signal and a second local oscillating signal, a frequency of the first local oscillating signal varying in a frequency range with each frequency corresponding to a sub-range of a coverage range scanned by the LFMCW radar;

mixing, by the local mixer, a copy of a transmitted radar signal and the first local oscillating signal to generate a first output signal corresponding to the received echo signal;

mixing, by the first mixer, the first output signal and the received echo signal to generate a second output signal that includes an intermediate frequency (IF) signal;

filtering the second output signal, by the BP filter, to generate a third output signal and select the IF signal with a first frequency corresponding to a sub-range of the coverage range scanned by the LFMCW radar; and mixing, by the second mixer, the second local oscillating signal and the third output signal to generate a fourth output signal that includes the baseband signal.

9. The method according to claim 8, wherein:

the LFMCW radar of the hidden chamber detector further includes a low pass (LP) filter, and the method further includes filtering out, by the LP filter, high frequency components from the fourth output signal to obtain the baseband signal.

10. The method according to claim 9, wherein:

the frequency synthesizer, the local mixer, the first mixer, the second mixer, the BP filter, and the LP filter of the LFMCW radar form a double superheterodyne receiver structure.

11. The method according to claim 7, wherein:

the hidden chamber detector further includes an inertial measurement unit (IMU), and the method further includes:

measuring movement of the hidden chamber detector by the IMU and providing the measured movement to the SAR imaging processor for forming the SAR image.

12. The method according to claim 7, wherein:

the hidden chamber detector further includes a display device; and the method further includes displaying the SAR image on the display device of the hidden chamber detector.

* * * * *